(12) United States Patent
Sung et al.

(10) Patent No.: US 12,034,811 B2
(45) Date of Patent: Jul. 9, 2024

(54) METHOD AND SYSTEM TO TRANSMIT AND RECEIVE DATA PACKETS THROUGH AT LEAST ONE END-TO-END CONNECTION

(71) Applicant: Pismo Labs Technology Limited, Kowloon (HK)

(72) Inventors: Patrick Ho Wai Sung, Hong Kong (HK); Ho Ming Chan, Hong Kong (HK); Kit Wai Chau, Hong Kong (HK); Min-Fu Tsai, New Taipei (TW)

(73) Assignee: Pismo Labs Technology Limited, Kowloon (HK)

( * ) Notice: Subject to any disclaimer, the term of this patent is extended or adjusted under 35 U.S.C. 154(b) by 0 days.

(21) Appl. No.: 17/868,053

(22) Filed: Jul. 19, 2022

(65) Prior Publication Data

US 2022/0360633 A1     Nov. 10, 2022

Related U.S. Application Data

(63) Continuation of application No. 17/085,207, filed on Oct. 30, 2020, now Pat. No. 11,394,785, which is a
(Continued)

(51) Int. Cl.
*H04L 67/14* (2022.01)
*H04L 12/64* (2006.01)

(52) U.S. Cl.
CPC .......... *H04L 67/14* (2013.01); *H04L 12/6418* (2013.01); *H04L 2012/6443* (2013.01)

(58) Field of Classification Search
CPC ................. H04L 67/14; H04L 12/6418; H04L 2012/6443; H04L 45/245
(Continued)

(56) References Cited

U.S. PATENT DOCUMENTS

| 5,625,877 A | 4/1997 | Dunn |
| 8,261,089 B2 | 9/2012 | Cobos |

(Continued)

FOREIGN PATENT DOCUMENTS

| CN | 1507734 A | 6/2004 |
| CN | 101682549 A | 3/2010 |

(Continued)

OTHER PUBLICATIONS

International Search Report of International Application No. PCT/IB2013/052490, mailed on Jan. 9, 2014.
(Continued)

*Primary Examiner* — Tan Doan (74) *Attorney, Agent, or Firm* — Stein IP, LLC (57) ABSTRACT

A method and system for transmitting and receiving data packets between two network nodes via one or more end-to-end connections. An interface is provided for selecting one or more possible end-to-end connection(s) or established end-to-end connection(s). The method and system may further comprise receiving a policy, wherein one or more selected end-to-end connections are established based, at least in part, on the policy. The policy may also restrict or promote selection of certain established end-to-end connection(s) via the interface provided. The selected and established end-to-end connection(s) are used for transmitting and receiving data packets.

20 Claims, 7 Drawing Sheets

Related U.S. Application Data continuation of application No. 14/125,951, filed as application No. PCT/IB2013/052490 on Mar. 28, 2013, now Pat. No. 10,862,972.

(58) Field of Classification Search
USPC .......................................................... 709/231
See application file for complete search history.

(56) References Cited

U.S. PATENT DOCUMENTS

| | | |
|---|---|---|
| 8,264,953 B2 | 9/2012 | Licardie |
| 9,641,661 B2 | 5/2017 | Chen |
| 2003/0167346 A1 | 9/2003 | Craft |
| 2006/0039366 A1 | 2/2006 | Ghosh |
| 2008/0080419 A1 | 4/2008 | Cole |
| 2008/0301333 A1* | 12/2008 | Butler ................ H04L 67/1023 710/38 |
| 2009/0046740 A1* | 2/2009 | Ruckart ................ H04W 28/20 370/468 |
| 2009/0067324 A1 | 3/2009 | Licardie |
| 2009/0097418 A1 | 4/2009 | Castillo |
| 2009/0161633 A1* | 6/2009 | Chen ................... H04M 1/2745 370/335 |
| 2009/0279564 A1* | 11/2009 | Li ........................ H04L 45/245 370/433 |
| 2010/0097956 A1 | 4/2010 | Tauil |
| 2010/0153969 A1 | 6/2010 | Dyba |
| 2013/0021968 A1* | 1/2013 | Reznik ................ H04L 45/245 370/328 |
| 2013/0036416 A1 | 2/2013 | Raju |
| 2013/0182601 A1* | 7/2013 | Bandyopadhyay ..... H04L 45/70 370/252 |
| 2014/0315536 A1 | 10/2014 | Chow |

FOREIGN PATENT DOCUMENTS

| | | |
|---|---|---|
| CN | 101986799 A | 3/2011 |
| CN | 102792637 A | 11/2012 |
| WO | 2009144528 A1 | 12/2009 |

OTHER PUBLICATIONS

Written Opinion of the International Searching Authority of International Application No. PCT/IB2013/052490, mailed on Jan. 9, 2014.
International Preliminary Report on Patentability of International Application No. PCT/IB2013/052490, issued on Sep. 29, 2015.
English Language Abstract of CN101986799A.
English Language Abstract of WO2009144528A1.
English Language Abstract of CN1507734A.
English Language Abstract of CN101682549A.
English Language Abstract of CN102792637A.
Office Action and Search Report in Chinese Patent Application No. 201380075154.0.
Examination Report and Cited Documents in GB Application No. GB1416215.0.

* cited by examiner

FIG. 7

METHOD AND SYSTEM TO TRANSMIT AND RECEIVE DATA PACKETS THROUGH AT LEAST ONE END-TO-END CONNECTION

RELATED APPLICATIONS

The present application is a Continuation application which claims the benefits of and is based on U.S. application Ser. No. 17/085,207 filed on 30 Oct. 2020 (now U.S. Pat. No. 11,394,785), which is based on U.S. application Ser. No. 14/125,951 filed on 8 Apr. 2014 (now U.S. Pat. No. 10,862,972), which is a National Stage Application and further claims the benefits of and is based on International Application No. PCT/IB2013/052490, filed on 28 Mar. 2013, the disclosures of which are hereby incorporated by specific reference thereto.

TECHNICAL FIELD

The invention relates generally to transmitting and receiving data packets via one or more end-to-end connections, more particularly, to choose one or more end-to-end connections from a plurality of end-to-end connections based on a policy.

BACKGROUND ART

When there is a plurality of end-to-end connections between two network nodes, the characteristics of the end-to-end connections may be different. For example, bandwidth of an end-to-end connection may be higher than that of another end-to-end connection. In another example, latency in one end-to-end connection may be smaller than that in another end-to-end connection. As data packet transmission and receiving requirements may be different for each application, user, and address, not all of the end-to-end connections are suitable for transmitting and receiving data packets. Using an unstable end-to-end connection to transfer and receive data packets may impact network performance significantly.

This situation is more undesirable if a session is using a plurality of end-to-end connections. In such case, a poor performance of one end-to-end connection may affect the overall performance of the session. For example, a file transfer application uses a TCP session to transfer a file from one network node to another network node and the TCP session is using a plurality of end-to-end connections. If one of the end-to-end connection experiences a 50% packet drop while other end-to-end connection experiences no packet drop, the file transfer application may experience a 50% packet drop.

In view of foregoing, it would be desirable to provide a technique to allow a user to select at least one end-to-end connection between two network nodes for transmitting and receiving data packets. More particularly, it would be desirable to provide a technique to allow a user to choose at least one end-to-end connection between two network nodes for transmitting and receiving particular data packets, wherein the at least one end-to-end connection satisfies a policy. More particularly, the policy is related to the time, expiration, location, network protocol, user, and/or application that the selected at least one end-to-end connection uses to transmit and receive the data packets.

SUMMARY

According to the present invention, a technique for allowing a user to select at least one end-to-end connection between two network nodes for transmitting and receiving data packets is provided. In one of the embodiments of the present invention, a method comprises the processes of determining the number of possible end-to-end connections between the first network node and the second network node; assigning an identity to each of the possible end-to-end connections; providing an interface for selecting at least one possible end-to-end connection; receiving selection information; establishing at least one possible end-to-end connection based on in part of the received selection information; transmitting and receiving data packets through the established at least one end-to-end connection.

In accordance with other aspects of the present invention, the method may further comprise the process of receiving a policy. Establishment of the at least one end-to-end connection is based on in part the received policy. The received policy may contain information related to time, expiration, location, network protocol, user, application and/or other information that is used to determine the conditions that the at least one end-to-end connection is to be established.

In accordance with other aspects of the present invention, the method may further comprise a process of providing recommendation information to the user to assist the user to select at least one end-to-end connection. In accordance with other aspects of the present invention, the method may further comprise the process of providing recommendation information to the user to assist the user to create a policy.

In accordance with other aspects of the present invention, the interface provided to a user for selecting at least one end-to-end connection is a user interface (UI). The UI may be implemented through a web browser or an application. In accordance with other aspects of the present invention, the interface provided to a user for selecting at least one end-to-end connection is an application programming interface (API). The API may be used by an application, which receives selection information of the at least one end-to-end connection from a user or another application and then transmits the selection information to the network node. The API may further be used for the receiving the recommendation and transmit the recommendation to the user or another application.

The selection of end-to-end connection is different from route selection in routing protocol as there is no routing table or route information exchange. The selection of end-to-end connection is also different from configuring policy for transmitting packets as end-to-end connection is for both receiving and transmitting packets.

BRIEF DESCRIPTION OF DRAWINGS

For a more complete understanding of the present invention. Reference is now made to the following descriptions taken in conjunction with the accompanying drawing, in which.

DETAILED DESCRIPTION

End-to-End Connections

Figure 1:
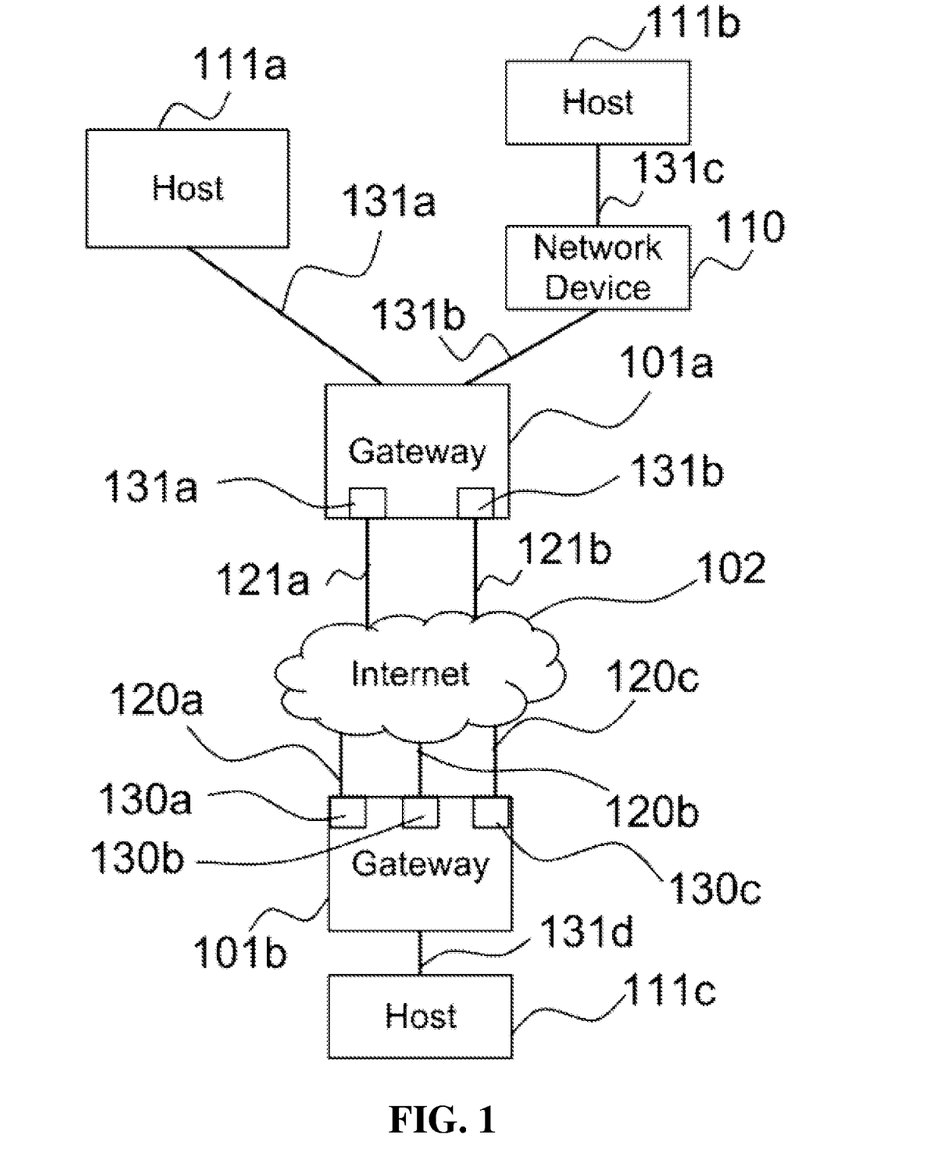
FIG. 1 is a network diagram illustrating end-to-end connections in a network environment according to one of the embodiments of the present invention.

According to one of the embodiments of the present invention illustrated in FIG. 1, gateway 101a connects to Internet 102 using network access links 121a and 121b via network interface 131a and 131b respectively. Gateway 101b connects to Internet 102 using network access links 120a, 120b and 120c via network interface 130a, 130b and 130c respectively. Therefore, a data packet from gateway 101a may arrive at gateway 101b through one of network access links 121a and 121b to Internet 102 first, then through one of network access links 120a, 120b and 120c. Therefore, gateways 101a and 101b are capable of establishing a plurality of end-to-end connections using network access links 120a, 120b, 120c, 121a and 121b.

In one of the embodiments, not all of the network interfaces comprised in gateway 101a are being used by gateway 101a, i.e., gateway 101a comprises a plurality of network interfaces and uses only network interfaces 131a and 131b from the plurality of network interfaces.

Embodiments concerning gateway 101a in this present invention are also applicable to gateway 101b.

Figure 2:
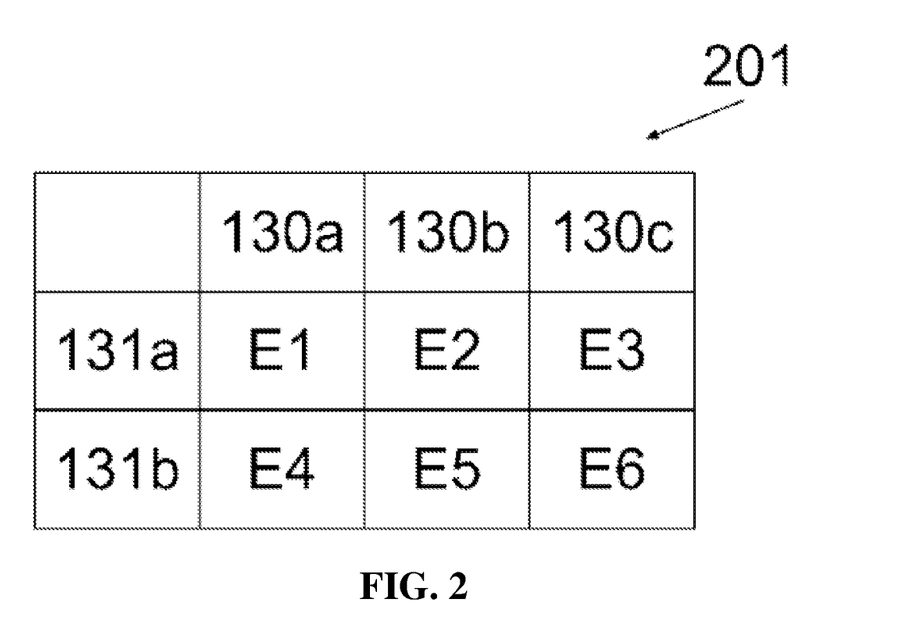
FIG. 2 illustrates a table representing six end-to-end connections.

FIG. 2 illustrates a table representing six end-to-end connections, namely E1, E2, E3, E4, E5 and E6, between gateways 101a and 101b using network access links 120a, 120b, 120c, 121a and 121b. End-to-end connection E1 is established using network access links 120a and 121a through network interfaces 130a and 131a respectively. End-to-end connection E2 is established using network access links 120b and 121a through network interfaces 130b and 131a respectively. End-to-end connection E3 is established using network access links 120c and 121a through network interfaces 130c and 131a respectively. End-to-end connection E4 is established using network access links 120a and 121b through network interfaces 130a and 131b respectively. End-to-end connection E5 is established using network access links 120b and 121b through network interfaces 130b and 131b respectively. End-to-end connection E6 is established using network access links 120c and 121b through network interfaces 130c and 131b respectively. The present invention does not limit the number of end-to-end connections to be the number of network access links at gateway 101a times the number of network access links at gateway 101b. The number of end-to-end connections can be more, equal to or less than the number of network access links at gateway 101a times the number of network access links at gateway 101b. For example, there may be a plurality of end-to-end connections established using network access links 120c and 121a together. In another example, no end-to-end connections may be established using network access links 120c and 121a.

According to one of the embodiments of the present invention, an end-to-end connection, an end-to-end connection is a connection between two network nodes. The end-to-end connection can be implemented by using connection-oriented networking technology or connectionless-oriented networking technology. The end-to-end connection can therefore be implemented by using TCP/IP, UDP/IP, IPSec and/or other different VPN technologies. Thus, when a first network node and a second network node are connected to an end-to-end connection according to the TCP/IP standard, the end-to-end connection is formed between an IP address in the first network node and an address of the second network node.

According to one of the embodiments of the present invention, a first end-to-end connection is implemented by using a plurality of end-to-end connections. For illustration purpose, the first end-to-end connection is between a first network node and a second network node. The first network node has a plurality of IP addresses. The second network node also has a plurality of IP addresses. Each of the plurality of end-to-end connection is formed between one of the first network node's IP addresses and one of the second network node's IP addresses using UDP/IP standard. The first end-to-end connection is formed between one of the first network node's IP addresses and one of the second network node's IP addresses using TCP/IP standard. Data packets belonging to the first end-to-end connection are carried by the plurality of end-to-end connections.

According to one of the embodiments of the present invention, the end-to-end connections are established end-to-end connections such that the end-to-end connections are established before being presented to a user for selection. According to one of the embodiments of the present invention, the end-to-end connections are possible end-to-end connections such that the end-to-end connections are not established before being presented to a user for selection.

Established End-to-End Connections

Figure 3:
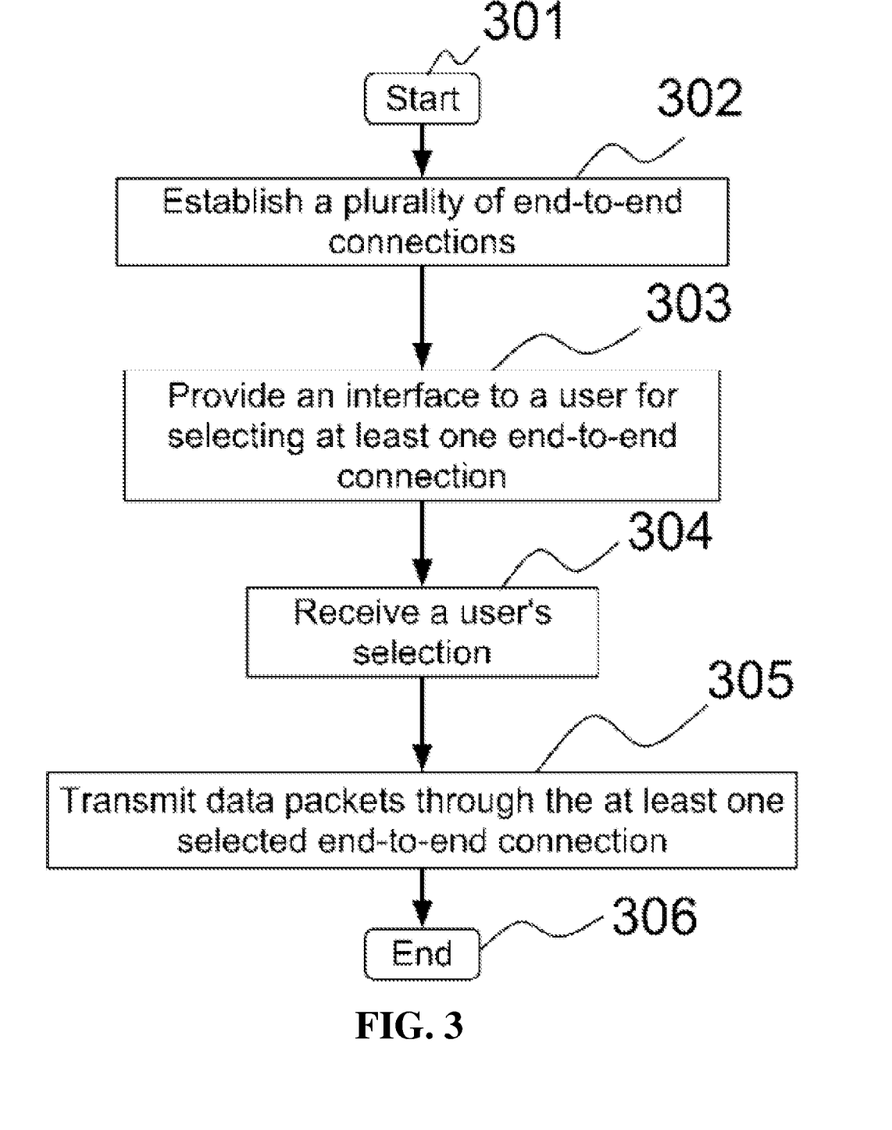
FIG. 3 illustrates a process for selecting one or more end-to-end connections according to one of the embodiments.

FIG. 3 illustrates a process according to one of the embodiments. FIG. 3 should be viewed in conjunction with FIG. 1 and FIG. 2. At step 301, the process begins. At step 302, gateway 101a establishes a plurality of end-to-end connections with gateway 101b through Internet 102 via network access links 121a, 121b, 120a, 120b and 120c. At step 303, gateway 101a provides an interface to a user for selecting at least one of the plurality of established end-to-end connections. Using FIG. 2 as an example, the end-to-end connections are E1, E2, E3, E4, E5 and E6. At step 304, after the user has selected at least one established end-to-end connection, gateway 101a received the user's selection through the interface. At step 305, gateway 101a transmits data packets to gateway 101b through the selected established end-to-end connections, where the data packets are designated for gateway 101b and/or hosts connected to gateway 101b. The process ends at step 306.

According to one of the embodiments of the present invention, gateway 101a sends information of the user's selection to gateway 101b after step 304. The information is to instruct gateway 101b which established end-to-end connections gateway 101b should use for transmitting data packets to gateway 101a. Furthermore, the information informs gateway 101b identities of established end-to-end connections that it should receive data packets from gateway 101a. As a result, gateway 101a receives data packets from gateway 101b through the selected established end-to-end connections, wherein the data packets are designated for gateway 101a and/or hosts connected to gateway 101a. Alternatively, gateway 101a does not send the information of the user's selection to gateway 101b and results in receiving data packets from gateway 101b through all established end-to-end connections, where the data packets are designated for gateway 101a and/or hosts connected to gateway 101a. The decision of whether gateway 101b sends data packets to gateway 101a using selected established end-to-end connections or all established end-to-end connections based on in part configuration of gateway 101b.

Possible End-to-End Connections

Figure 4:
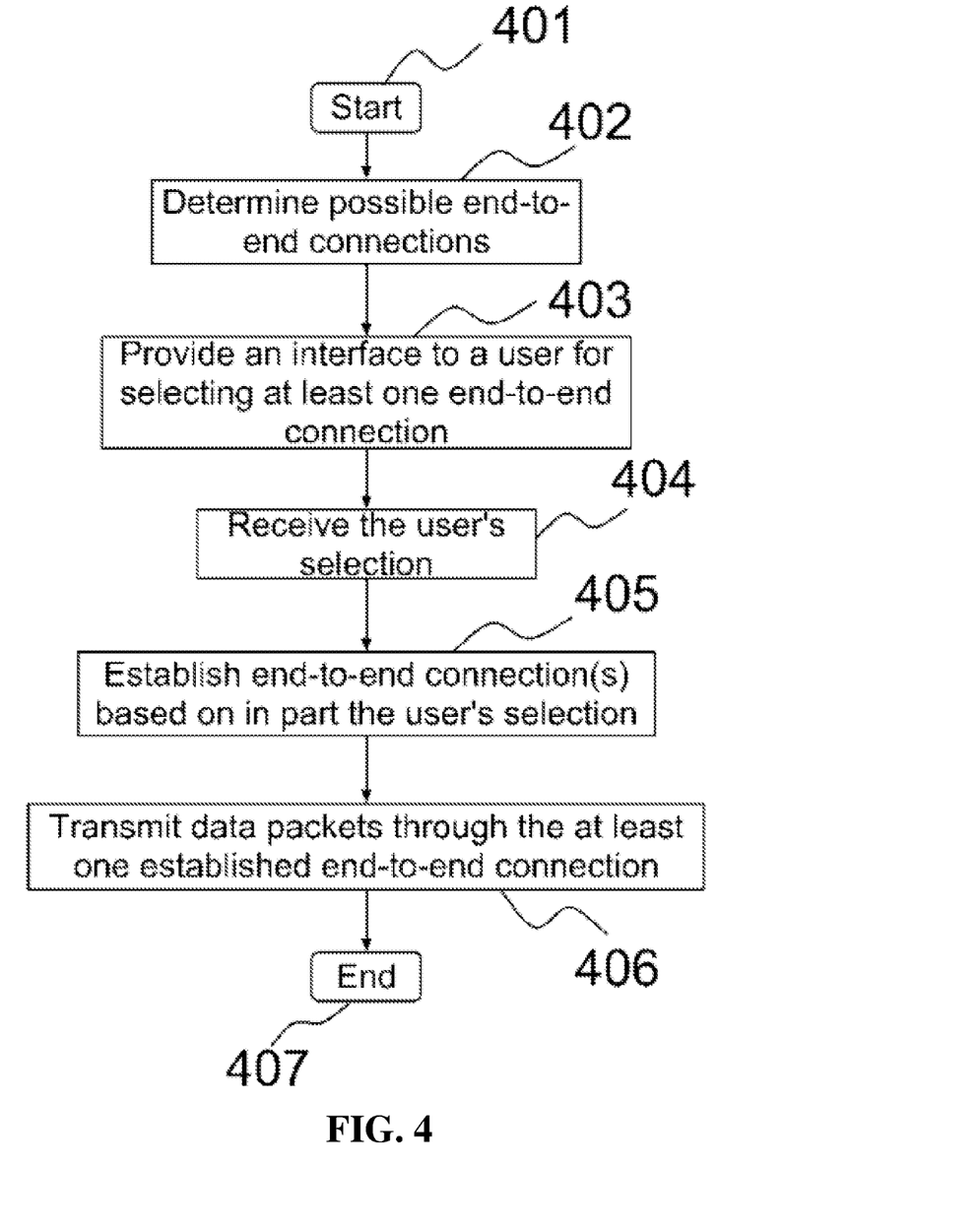
FIG. 4 a process for selecting one or more end-to-end connections according to one of the embodiments.

FIG. 4 illustrates a process according to one of the embodiments. FIG. 4 should be viewed in conjunction with FIG. 1 and FIG. 2. At step 401, the process begins. At step 402, gateway 101a determines possible end-to-end connections that can be established with gateway 101b. At step 403, gateway 101a provides an interface to a user for selecting at least one of the plurality of possible end-to-end connections. Using FIG. 2 as an example, the end-to-end connections are E1, E2, E3, E4, E5 and E6. At step 404, after the user has selected at least one possible end-to-end connection, gateway 101a received the user's selection through the interface. At step 405, gateway 101a establishes end-to-end connection(s) based on in part the user's selection. At step 406, gateway 101a transmits data packets to gateway 101b through the selected established end-to-end connections, where the data packets are designated for gateway 101b and/or hosts connected to gateway 101b. The process ends at step 407.

According to one of the embodiments of the present invention, gateway 101a determines the possible end-to-end connections in step 402 by communicating with gateway 101b to retrieve network interface identity of gateway 101b. In one variant, in addition to network interface identity, gateway 101b provides characteristics of its network interface(s), including IP address, Media Access Control (MAC) address, connection medium, connection technology, performance data statistics and other information that can assist a user to select end-to-end connections. In one variant, only identities of network interface(s) that are available for establishing end-to-end connections are provided by gateway 101b to gateway 101a.

According to one of the embodiments of the present invention, gateway 101a determines the possible end-to-end connections in step 402 by using a default configuration. The default configuration is retrieved from a computer readable storage medium at gateway 101a or from a remote host. The default configuration contains network interface identity of a typical gateway that can form end-to-end connections with gateway 101a. For example, gateway 101a through the interface provides a list of its own network interfaces and a default list of network interface of gateway 101b for the user to select. It is possible that gateway 101a does not know the number of network interfaces available at gateway 101b. It is also possible that gateway 101a has not communicated to gateway 101b yet when providing the list of network interfaces of gateway 101b for the user to select. Hence, using a default configuration may result in selected end-to-end connections not being able to be established.

However, using default configuration could allow a user to select possible end-to-end connections regardless of whether a gateway at the other end of end-to-end connections is not reachable during selection. For example, gateway 101a provides an interface, which shows its network interfaces 131a and 131b and a list of network interfaces retrieved from the default configuration for gateway 101b for a user to select, regardless of whether gateway 101a can communicate with gateway 101b.

According to one of the embodiments of the present invention, gateway 101a sends information of the user's selection to gateway 101b after step 404. The information is to instruct gateway 101b to establish end-to-end connections with gateway 101a. In one variant, the information is also to instruct gateway 101b which end-to-end connections should be used for transmitting data packets to gateway 101a. Further, the information informs gateway 101b the identity of established end-to-end connections through which it should receive data packets from gateway 101a. As a result, gateway 101a receives data packets from gateway 101b through the selected established end-to-end connections, where the data packets are designated for gateway 101a and/or hosts connected to gateway 101a. Alternatively, gateway 101a does not send the information of the user's selection to gateway 101b and results in receiving data packets from gateway 101b through all established end-to-end connections, where the data packets are designated for gateway 101a and/or hosts connected to gateway 101a. The decision of whether gateway 101b should send data packets to gateway 101b using selected established end-to-end connections or all established end-to-end connections based on in part configuration of gateway 101b.

According to one of the embodiments of the present invention, when gateway 101a, at step 403, provides an interface to a user for selecting at least one of the plurality of possible end-to-end connections, one or more of the plurality of possible end-to-end connections may not be established with gateway 101b. In such case, gateway 101a is not able to send packets using the selected end-to-end connection(s). In one variant, gateway 101a will inform the user through the interface that one or more of the selected end-to-end connections cannot be established.

Interface

According to one of the embodiments of the present invention, when gateway 101a provides an interface for a user to select end-to-end connections at step 303 and step 403, the interface is a user-interface. The user-interface (UI) can be provided to the user through web technologies, text command, voice control, motion control and/or other techniques that can receive inputs from a user. For example, gateway 101a sends a web page to a mobile phone browser showing that established end-to-end connections E1, E2, E3, E4, E5 and E6 are available for selection. The user then uses a browser to interact with the web page to select at least one of E1, E2, E3, E4, E5 and E6. In another example, a user uses a laptop to connect to gateway 101a through a console port and then use the console port as the interface to select end-to-end connection(s). Authentication may be required before gateway 101a provides the UI to the user.

According to one of the embodiments of the present invention, in order to allow a user to easily identify the plurality of end-to-end connections, the end-to-end connections are assigned with identities. For example end-to-end connections E1, E2, E3, E4, E5 and E6 are assigned with identities "E1", "E2", "E3", "E4", "E5" and "E6" respectively. In another example, end-to-end connections E1, E2, E3, E4, E5 and E6 are assigned with identities "Toronto", "Paris", "New York", "Tokyo", "Not available" and "Not available". The "Not available" identity informs the user that a particular end-to-end connection is not available for selection. The assignment of identities to the end-to-end connections is applicable for established end-to-end connections and possible end-to-end connections.

According to one of the embodiments of the present invention, when gateway 101a provides an interface for a user to select end-to-end connections at step 303 and step 403, the interface is an application programming interface (API). The API can be provided to the user through Internet Protocol (IP), web technologies, and/or other techniques that allow a software running in a device to receive a selection of end-to-end connection(s) from a user and then to send the selection to gateway 101a. For example, an application running in a laptop using the API to retrieve the identities of established end-to-end connections E1, E2, E3, E4, E5 and E6 from gateway 101a and to send the selection of established end-to-end connection(s) received from a user to gateway 101a. The API may further allow gateway 101a to authenticate with the users and recognize the selection. In another example, the API allows an application running in a user's mobile device to interact with gateway 101a through web technologies, including authentication, receiving the identity of end-to-end connections and sending the selections of end-to-end connection(s).

According to one of the embodiments of the present invention, when gateway 101a provides an interface for a user to select end-to-end connections at step 303 and step 403, the established end-to-end connection is represented by pairs of network interfaces and each pair of network interfaces comprise one network interface from gateway 101a and one network interface from gateway 101b. For example, established end-to-end connection E1 is provided to a user for selection through an interface using the identity of network interfaces 130a and 131a. Alternatively, established end-to-end connection E1 is provided to a user for selection through an interface using labels "WAN 1 of Gateway 1" and "WAN 1 of Gateway 2" to network interfaces 130a and 131a respectively. The use of network interface identity is able to assist a user to identify a network interface in the gateway visually.

Figure 5:
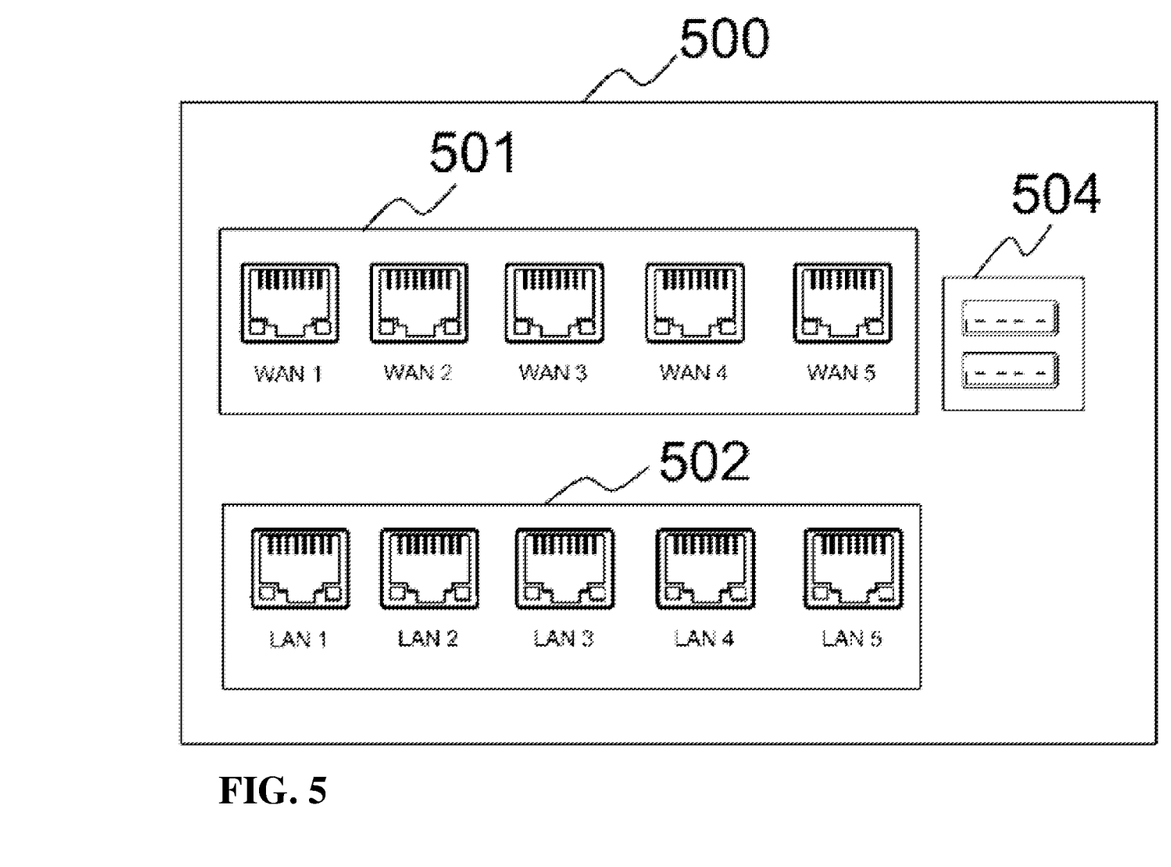
FIG. 5 is an illustration of a back-panel of a gateway according to one of the embodiments of the present invention.

FIG. 5 is an illustration of a back-panel of gateway 101a according to one of the embodiments. Back-panel 500 comprises Wide Area Network (WAN) interfaces 501, Local Area Network (LAN) interfaces 502 and Universal Serial Bus (USB) interfaces 504. WAN interfaces 501 comprises five Ethernet ports WAN1, WAN2, WAN3, WAN4, and WAN5 which are configured for connecting to one or more WANs. LAN interfaces 502 comprises five Ethernet ports LAN1, LAN2, LAN3, LAN4, and LAN5 which are configured for connecting to one or more LANs. USB interfaces 504 comprises two USB ports that may be used to connect to a wireless WAN, for example, through a USB modem capable of providing mobile internet using wireless technologies, including WiFi, WiMax, 3G, 4G, LTE, etc. Functions of WAN interfaces 501, LAN interfaces 502 and USB interfaces 504 are further explained in FIG. 6, which is an illustration of a user interface through which the user can select network interfaces shown in back-panel 500 to establish end-to-end connections with another gateway.

Figure 6:
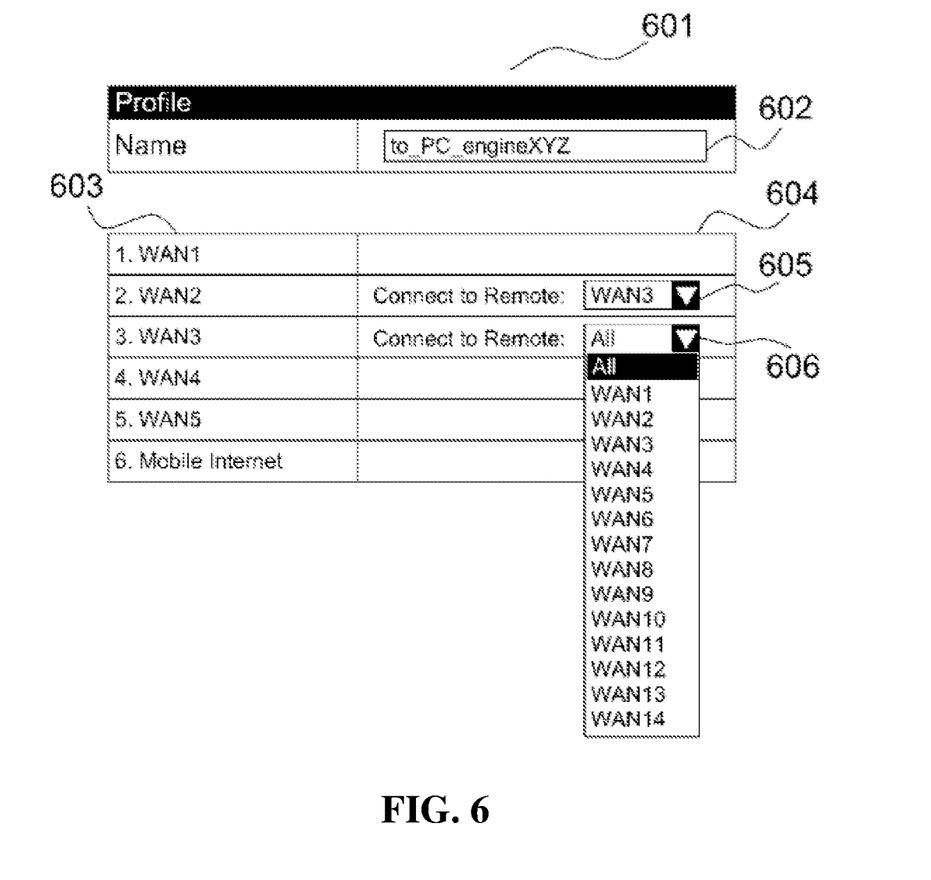
FIG. 6 illustrates a user interface for selecting end-to-end connections according to one of the embodiments of the present invention.

FIG. 6 illustrates one of the embodiments of the present invention. The plurality of end-to-end connections is presented by WAN identifications shown on WAN interface 501 of back-panel 500 of a gateway. 601 is a web-based user interface of a first gateway using HTML to allow a user to select possible end-to-end connections. Label 602 is the name of a profile. Column 603 lists all the Wide Area Network (WAN) interfaces of the first gateway. As shown in column 603, there are six WAN interfaces, namely WAN1, WAN2, WAN3, WAN4, WAN5 and Mobile Internet. Mobile Internet is a WAN using wireless technology, including WiFi, WiMax, 3G, 4G, LTE, etc. Column 604 lists the WAN interface of a second gateway. Pull down list 605 is WAN3. This means that the user has chosen WAN2 of the first gateway to form an end-to-end connection with WAN3 of the second gateway. Pull-down list 606 shows all the possible WAN interfaces of the second gateway to form another end-to-end connection. There are fourteen WAN interfaces for selection in pull-down list 606. In one variant, the fourteen WAN interfaces are the WAN interfaces of the second gateway that can be connected to the first gateway. In one variant, whether each of the fourteen WAN interfaces can be connected to the first gateway is unknown. In one variant, the second gateway does not have the fourteen WAN interfaces and the fourteen WAN interfaces are shown in the user interface because of a default configuration of the first gateway. In one variant, only two of WAN interfaces, i.e. WAN2 and WAN3, of the first gateway can form end-to-end connections with the second gateway because only WAN2 and WAN3 can communicate with the second gateway. For example, only WAN2 and WAN3 are connected to the Internet.

In one variant, network interfaces at gateway 101a and gateway 101b are represented by IP addresses. As an IP address can be assigned to different network interfaces of a gateway, the use of IP address provides flexibility in choosing network interface to selecting end-to-end connections. In one variant, network interfaces at gateway 101a and gateway 101b are represented by Media Access Control (MAC) address.

According to one of the embodiments of the present invention, gateway 101a provides recommendation through the interface to the user to assist the user in selecting end-to-end connection(s). The recommendation is based, at least in part, on packet loss, latency, bandwidth, and other network characteristics that are observable at gateway 101a. The recommendation may be shown to the user through a web page or messages. The recommendation is useful because a user may find it difficult to select end-to-end connection(s) if the user is not familiar with the usage of different network characteristics observed. The recommendation can be presented to the user in the form of a verbose message, multiple choices, visual symbols, graphics or sounds.

Policy

According to one of the embodiments of the present invention, not all of established end-to-end connections or possible end-to-end connections can be selected by the user. Policies at gateway 101a may determine which end-to-end connections can be selected by the user. The policies can be configured by the manufacturer, an administrator and/or a user of gateway 101a.

In one of the embodiments, the use of policies is to restrict or to promote certain end-to-end connections for the user to select. A policy may impose conditions to determine which established end-to-end connections or possible end-to-end connections can be selected by the user. For example, referring to FIG. 2, E1, E2, E3, E4, E5 and E6 are the six established end to end connections. A policy may promote the use of end-to-end connections E1, E2 and E4 and restricts the use of end-to-end connections E3, E5, and E6 by letting the user only select either end-to-end connection E1, E2 and/or E4. A policy may be based on various factors such cost, bandwidth, latency, packet drop rate and/or reliability reasons. For example, using end-to-end connections E1, E2, and/or E4 may be more cost-effective than using end-to-end connections E3, E5, and/or E6, and thus the policy promotes the use of end-to-end connections E1, E2 and E4 and restricts the use of end-to-end connections E3, E5, and E6.

In one of the embodiments, the use of policies is to promote or restrict certain selected end-to-end connections to be used by a gateway to transmit or receive data. For example, a policy determines the time that gateway 101a must transmit data packets to gateway 101b through the selected end-to-end connections. In another example, a policy determines when gateway 101a must stop only using the selected end-to-end connections to transmit data packets to gateway 101b and gateway 101a may use all end-to-end connections to transmit data packets to gateway 101b. In another example, a policy restricts that gateway 101a must use the selected end-to-end connections to transmit data packets received from a host, a location or a region to gateway 101b. In another example, a policy promotes that gateway 101a can use the selected end-to-end connections, in addition to other to end-to-end connections, to transmit data packets gateway 101b when the data packets belong to a network protocol specified in the policy. The network protocol includes but not limited to TCP, UDP, SIP, VoIP related network protocol, and video related network protocol. In another example, a policy restricts that gateway 101a must use the selected end-to-end connections to transmit data packets received from hosts authenticated using a user's authentication information to gateway 101b. In another example, a policy restricts that gateway 101a must use the selected end-to-end connections to transmit data packets to gateway 101b if the data packets belong to a specific type specified by the policy.

Those skilled in the arts would appreciate that there are many reasons, including cost, bandwidth, latency, packet drop rate and reliability reasons, why an end-to-end connection should be restricted or promoted to be used by the user.

According to one of the embodiments of the present invention, the policies can also be received by gateway 101a remotely through an interface, which can be a UI or an API. The interface allows a user to change one or more policies when necessary.

Aggregated End-to-End Connection

According to one of the embodiments of the present invention, the end-to-end connections belong to the one aggregated end-to-end connection. Therefore, for the perspective of hosts and network devices, such as host 111a and 111b and network device 110 connected to gateway 101a, there is only one aggregated end-to-end connection between gateway 101a and gateway 101b. For example, host 111a is able to establish a TCP FTP session with host 111c using the aggregated end-to-end connection to transfer a file from host 111a to host 111c. Data packets belonging to the TCP FTP session is sent from host 111a to host 111c through selected end-to-end connection(s), which belong(s) to the aggregated end-to-end connection. In each of the end-to-end connections, data packets can be sent by gateway 101a using TCP, UDP or other protocols. Gateway 101b is able to reorder the data packets belong to the TCP FTP session and send to host 111c using TCP protocol.

According to one of the embodiments of the present invention, label 602 is the profile name of an aggregated end-to-end connection, which is capable of forming two end-to-end connections using WAN2 and WAN3 of a gateway.

System

Figure 7:
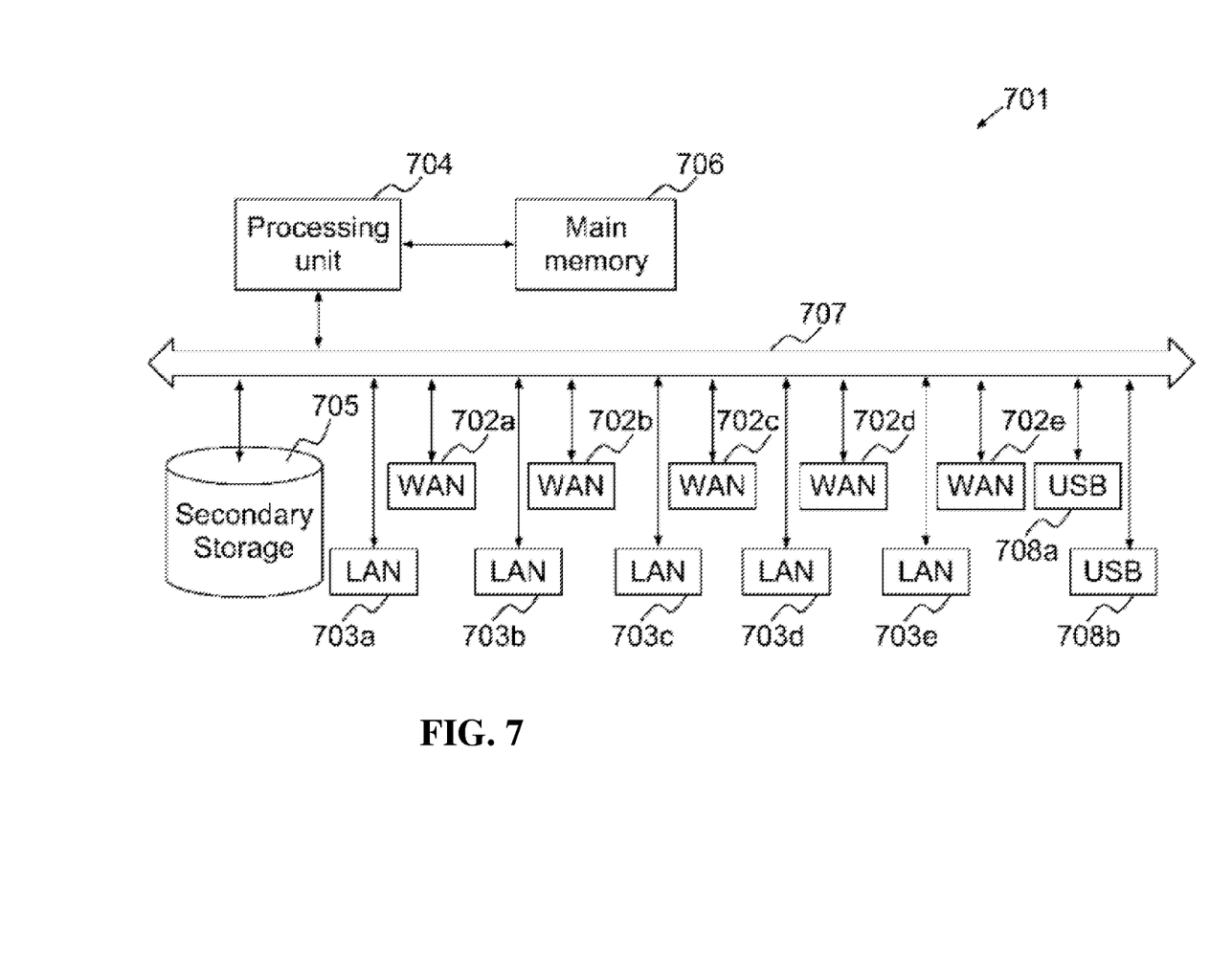
FIG. 7 is an illustrative block diagram of a gateway according to one of the embodiments of the present invention.

FIG. 7 is an illustrative block diagram of gateway 701 according to one of the embodiments. Gateway 701 may represent gateway 101a and gateway 101b. Back-panel 500 may represent the back-panel of gateway 701. Gateway 701 comprises WAN interfaces 702a, 702b, 702c, 702d, and 702e, LAN interfaces 703a, 703b, 703c, 703d and 703e, and USB interfaces 708a and 708b. Gateway 701 further comprises processing unit 704, main memory 706, secondary storage 705, and system bus 707. Processing unit 704 and main memory 706 are connected to each other directly. System bus 707 connects processing unit 704 directly or indirectly to secondary storage 705, WAN interfaces 702a-702e, LAN interfaces 703a-703e, and USB interfaces 708a-708b. Using system bus 707 allows gateway 701 to have increased modularity. System bus 707 couples processing unit 704 to secondary storage 705, WAN interfaces 702a-702e, LAN interface 703a-703e and USB interfaces 708a-708b. System bus 707 can be any of several types of bus structures including a memory bus, a peripheral bus, and a local bus using any of a variety of bus architectures. Secondary storage 705 stores program instructions for execution by processing unit 704.

In one of the embodiments, gateway 701 establishes a plurality of end-to-end connections with another gateway through at least two of WAN interfaces 702a, 702b, 702c, 702d, and 702e or USB interfaces 708a and 708b. Gateway 701 uses at least one of the LAN interfaces 703a, 703b, 703c, 703d, and 703e to connect to a host or a network device, For example, gateway 701 can be connected to a network device through one of the LAN interfaces 703a, 703b, 703c, 703d, and 703e, and can also be connected to a host through another one of the LAN interfaces 703a, 703b, 703c, 703d, and 703e. Information of the plurality of end-to-end connections is stored in secondary storage 705. The user of gateway 701 can select at least one of the plurality of end-to-end connections via an interface provided by gateway 701 to the user, and information of the end-to-end connections selected is received by gateway 701 through the interface. Information of the selected end-to-end connections is also stored in secondary storage 705. Gateway 701 transmits data packets via the end-to-end connections selected. The data packets may include the information of the selected end-to-end connections that had been stored in secondary storage 705.

In one of the embodiments, processing unit 704 of gateway 701 determines possible end-to-end connections that can be established with another gateway via WAN interfaces 702a, 702b, 702c, 702d, and 702e and USB interfaces 708a and 708b. Information of the possible end-to-end connections is stored in secondary storage 705. The user of gateway 701 can select at least one of the possible end-to-end connections via an interface provided by gateway 701 to the user, and information of the possible end-to-end connections selected is received by gateway 701 through the interface. Information of the possible end-to-end connections selected is stored in secondary storage 705. Gateway 701 establishes end-to-end connections based on in part the user's selection and transmits data packets via the end-to-end connections established.

In one of the embodiments, policies are stored in secondary storage 705 of gateway 701. The policies may determine which possible end-to-end connections or established end-to-end connections with another gateway can be selected by the user. The policies can be configured by the manufacturer, an administrator and/or user of gateway 701. The policies are retrieved by processing unit 704 from secondary storage 705 through system bus 707 to determine which end-to-end connections should be used to transmit data packets to the another gateway. Alternatively, the policies may be received by gateway 701 from an external server through WAN interfaces 702a, 702b, 702c, 702d, or 702e, or USB interfaces 708a and/or 708b, and then stored in secondary storage 705.

According to one of the embodiments of the present invention, gateway 701 is realized by one or more virtual machines at system. The network interface can be implemented by configuration the one or more virtual machines. Those skilled in the art should appreciate there are myriad ways to realize gateway 701 in a system implemented by virtual machines.

What is claimed is:

1. A method for transmitting and receiving data packets at a first network node with a second network node, comprising:

(a) receiving at least one network interface identity of the second network node;
(b) establishing, based on the at least one network interface identity, a first plurality of end-to-end connections with the second network node;
(c) determining a policy;
(d) promoting, based on the policy, a second plurality of end-to-end connections from the first plurality of end-to-end connections to be selected;
(e) selecting, based on the policy, at least one second end-to-end connection from the second plurality of end-to-end connections to be used for transmitting and receiving the data packets;
(f) transmitting selection information to the second network node; and
(q) transmitting and receiving, based on the policy, the data packets with the second network node through the at least one second end-to-end connection;
wherein:
the second plurality of end-to-end connections is promoted at step (d) to be used to transmit and to receive the data packets;
the selection information includes information of the selection of the at least one second end-to-end connection at step (e);
the selection information instructs the second network node to transmit and to receive the data packets through the at least one second end-to-end connection with the first network node;
the policy is retrieved from a storage medium of the first network node or received remotely through an interface of the first network node;
the policy determines when the first network node is to transmit and receive the data packets with the second network node through the at least one second end-to-end connection;
the policy determines when the first network node is to stop transmitting and receiving the data packets with the second network node through the at least one second end-to-end connection;
the first plurality of end-to-end connections is aggregated to form an aggregated end-to-end connection; and
each end-to-end connection in the first plurality of end-to-end connections is established by using one of: (i) a Transmission Control Protocol (TCP), (ii) a User Datagram Protocol (UDP), (iii) an Internet Protocol Security (IPsec), and (iv) a Virtual Private Network (VPN) technology.

2. The method of claim 1, wherein:
the policy is received from the second network node when the policy is received remotely through the interface of the first network node;
the interface of the first network node allows changing of the policy at the first network node;
the at least one network interface identity includes information of at least one of: Internet Protocol (IP) address, Media Access Control (MAC) address, connection medium, connection technology, performance data statistics, and availability of network interface; and
the interface of the first network node is an application programming interface (API).

3. The method of claim 1, wherein:
if the second network node is not reachable before establishing the first plurality of end-to-end connections:
(i) the first network node determines a plurality of possible end-to-end connections based on a default configuration; and
(ii) the first plurality of end-to-end connections are established from the plurality of possible end-to-end connections;
the at least one second end-to-end connection is formed between one IP address of the first network node and one IP address of the second network node; and
the policy is created using recommendation information provided at the first network node.

4. The method of claim 1, wherein:
the policy is configured by a first user of the first network node or a second user of the second network node; and
the policy is based on, in part, one of: (i) a time, (ii) an expiration, (iii) a location, (iv) a network protocol, (v) a user, (vi) an application, (vii) a cost, (viii) a latency, and (ix) a packet drop rate.

5. The method of claim 4, wherein:
the policy imposes at least one condition to select the at least one second end-to-end connection by the first user;
the first network node provides a recommendation to the first user to select the at least one second end-to-end connection at step (e) through a webpage or a message; and
the recommendation is based on, at least in part, one or more of: (i) packet loss, (ii) a latency, and (iii) a bandwidth.

6. The method of claim 1, further comprising:
(f) restricting, based on the policy, one or more end-to-end connections from the first plurality of end-to-end connections;
wherein the one or more end-to-end connections are restricted from the first plurality of end-to-end connections to be not used to transmit and to receive the data packets.

7. The method of claim 1, wherein:
the policy allows the first network node to transmit and receive the data packets through the at least one second end-to-end connection if the data packets belong to a network protocol specified in the policy;
the first plurality of end-to-end connections is established based on one of: (i) a selection of one or more network interfaces of the first network node, and (ii) a selection of one or more network interfaces of the second network node; and
the one or more network interfaces of the first network node are represented by IP addresses or MAC addresses different from IP addresses or MAC addresses of the one or more network interfaces of the second network node.

8. The method of claim 7, wherein the selection of the one or more network interfaces of the first network node is performed through a user interface (UI) or an API at the first network node.

9. The method of claim 7, wherein the selection of the one or more network interfaces of the second network node is performed through a UI or an API at the first network node.

10. The method of claim 7, wherein the selection of the one or more network interfaces of the first network node and the selection of the one or more network interfaces of the second network node are assigned with a profile.

11. A first network node, comprising:
at least one processing unit;
at least one main memory; and
at least one storage medium comprising program instructions executable by the at least one processing unit for:
(a) receiving at least one network interface identity of the second network node;

(b) establishing, based on the at least one network interface identity, a first plurality of end-to-end connections with a second network node;
(c) determining a policy;
(d) promoting, based on the policy, a second plurality of end-to-end connections from the first plurality of end-to-end connections to be selected;
(e) selecting, based on the policy, at least one second end-to-end connection from the second plurality of end-to-end connections to be used for transmitting and receiving data packets;
(f) transmitting selection information to the second network node; and
(q) transmitting and receiving, based on the policy, data packets with the second network node through the at least one end-to-end connection;
wherein:
the second plurality of end-to-end connections is promoted at step (d) to be used to transmit and to receive the data packets;
the selection information includes information of the selection of the at least one second end-to-end connection at step (e);
the selection information instructs the second network node to transmit and to receive the data packets through the at least one second end-to-end connection with the first network node;
the policy is retrieved from the at least one storage medium or received remotely through an interface of the first network node;
the policy determines when the first network node is to transmit and receive the data packets with the second network node through the at least one second end-to-end connection;
the policy determines when the first network node is to stop transmitting and receiving the data packets with the second network node through the at least one second end-to-end connection;
the first plurality of end-to-end connections is aggregated to form an aggregated end-to-end connection; and
each end-to-end connection in the plurality of end-to-end connections is established by using one of: (i) a Transmission Control Protocol (TCP), (ii) a User Datagram Protocol (UDP), (iii) an Internet Protocol Security (IPsec), and (iv) a Virtual Private Network (VPN) technology.

12. The first network node of claim 11, wherein:
the policy is received from the second network node when the policy is received remotely through the interface of the first network node;
the interface of the first network node allows changing of the policy at the first network node;
the at least one network interface identity includes information of at least one of: Internet Protocol (IP) address, Media Access Control (MAC) address, connection medium, connection technology, performance data statistics, and availability of network interface; and
the interface of the first network node is an application programming interface (API).

13. The first network node of claim 11, wherein:
if the second network node is not reachable before establishing the first plurality of end-to-end connections:
 (i) the first network node determines a plurality of possible end-to-end connections based on a default configuration; and
 (ii) the first plurality of end-to-end connections are established from the plurality of possible end-to-end connections;
the at least second one end-to-end connection is formed between one IP address of the first network node and one IP address of the second network node; and
the policy is created using recommendation information provided at the first network node.

14. The first network node of claim 11, wherein:
the policy is configured by a first user of the first network node or a second user of the second network node; and
the policy is based on, in part, one of: (i) a time, (ii) an expiration, (iii) a location, (iv) a network protocol, (v) a user, (vi) an application, (vii) a cost, (viii) a latency, and (ix) a packet drop rate.

15. The first network node of claim 14, wherein:
the policy imposes at least one condition to select the at least one second end-to-end connection by the first user;
the first network node provides a recommendation to the first user to select the at least one second end-to-end connection at step (e) through a webpage or a message; and
the recommendation is based on, at least in part, one or more of: (i) packet loss, (ii) a latency, and (iii) a bandwidth.

16. The first network node of claim 11, wherein the at least one storage medium comprising further program instructions executable by the at least one processing unit for:
(f) restricting, based on the policy, one or more end-to-end connections from the first plurality of end-to-end connections;
wherein the one or more end-to-end connections are restricted from the first plurality of end-to-end connections to be not used to transmit and to receive the data packets.

17. The first network node of claim 11, wherein:
the policy allows the first network node to transmit and receive the data packets through the at least one second end-to-end connection if the data packets belong to a network protocol specified in the policy;
the first plurality of end-to-end connections is established based on one of: (i) a selection of one or more network interfaces of the first network node, and (ii) a selection of one or more network interfaces of the second network node; and
the one or more network interfaces of the first network node are represented by IP addresses or MAC addresses different from IP addresses or MAC addresses of the one or more network interfaces of the second network node.

18. The first network node of claim 17, wherein the selection of the one or more network interfaces of the first network node is performed through a user interface (UI) or an API at the first network node.

19. The first network node of claim 17, wherein the selection of the one or more network interfaces of the second network node is performed through a UI or an API at the first network node.

20. The first network node of claim 17, wherein the selection of the one or more network interfaces of the first network node and the selection of the one or more network interfaces of the second network node are assigned with a profile.

* * * * *